United States Patent
Pimentel et al.

(10) Patent No.: US 8,295,157 B1
(45) Date of Patent: Oct. 23, 2012

(54) SYSTEMS AND METHODS FOR USING OUT-OF-BAND PROTOCOLS FOR REMOTE MANAGEMENT WHILE IN-BAND COMMUNICATION IS NOT AVAILABLE

(75) Inventors: Plinio Pimentel, Highland, UT (US); Petros G. Giforos, American Fork, UT (US)

(73) Assignee: Crimson Corporation, Dover, DE (US)

( * ) Notice: Subject to any disclaimer, the term of this patent is extended or adjusted under 35 U.S.C. 154(b) by 805 days.

(21) Appl. No.: 11/401,156

(22) Filed: Apr. 10, 2006

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ......... 370/216; 370/241; 370/242; 370/384

(58) Field of Classification Search .................. 370/242
See application file for complete search history.

(56) References Cited

U.S. PATENT DOCUMENTS

| | | | |
|---|---|---|---|
| 2002/0103943 A1* | 8/2002 | Lo et al. | 710/2 |
| 2004/0103220 A1* | 5/2004 | Bostick et al. | 709/253 |
| 2005/0138171 A1* | 6/2005 | Slaight | 709/225 |
| 2005/0240669 A1 | 10/2005 | Khanna et al. | |
| 2005/0276228 A1* | 12/2005 | Yavatkar et al. | 370/242 |
| 2006/0005245 A1 | 1/2006 | Durham et al. | |
| 2006/0031447 A1 | 2/2006 | Holt et al. | |
| 2006/0259612 A1* | 11/2006 | De Oliveira et al. | 709/224 |

\* cited by examiner

*Primary Examiner* — Jae Y Lee
(74) *Attorney, Agent, or Firm* — Austin Rapp & Hardman

(57) ABSTRACT

In an exemplary embodiment, an out-of-band management stack that is located on a managed node receives at least one management command from an out-of-band management application that is located on an administrative system. A monitoring agent on the managed node obtains the at least one management command. For example, the out-of-band management stack may forward the at least one management command to the monitoring agent. Alternatively, the out-of-band management stack may write the at least one management command to a designated location on the managed node, and the monitoring agent may read the at least one management command from the designated location. In response to obtaining the at least one management command, the monitoring agent processes and carries out the at least one management command.

18 Claims, 10 Drawing Sheets

SYSTEMS AND METHODS FOR USING OUT-OF-BAND PROTOCOLS FOR REMOTE MANAGEMENT WHILE IN-BAND COMMUNICATION IS NOT AVAILABLE

TECHNICAL FIELD

The present invention relates generally to computers and computer-related technology. More specifically, the present invention relates to systems and methods for using out-of-band protocols for remote management while in-band communication is not available.

BACKGROUND

Many businesses and other types of organizations have a number of computers that are used by employees. These computers are often interconnected to form a computer network. One or more system administrators may be responsible for managing the organization's computers. A system administrator's responsibilities typically include installing and configuring new hardware and software, assigning user accounts and passwords, establishing security access levels, performing backups, troubleshooting reported problems, and so forth. In larger organizations, some of these tasks may be divided between different system administrators. A computer system that is used by a system administrator is commonly referred to as an administrative system. The computers (or other electronic devices) that a system administrator manages may be referred to as managed nodes.

Systems management software may be used to provide system administrators with the ability to remotely perform management operations on managed nodes. This remote management capability can save system administrators a significant amount of time, because they are able to perform management operations on a managed node without the need to physically visit the managed node. An example of systems management software that is used by various organizations is the LANDesk® Management Suite. Systems management software enables a system administrator who is working at an administrative system to send management-related requests to managed nodes, which process and fulfill the requests.

Most systems management software communicates with managed nodes over the same logical communication channel that the managed node uses to communicate with other devices that are connected to the organization's computer network. This is often referred to as "in-band" management.

Unfortunately, in-band management tools may be ineffective when a managed node loses network connectivity or is otherwise unavailable for in-band communication. When managed nodes cannot be accessed in-band, an out-of-band infrastructure may be used. Out-of-band management tools and protocols enable the remote monitoring and control of managed nodes even when these devices lose network connectivity. Some examples of known out-of-band management tools include implementations of the Intelligent Platform Management Interface (IPMI), Intel® Active Management Technology (AMT), ASF, and so forth.

System administrators are under a tremendous amount of pressure to perform their duties in an efficient and productive manner. Accordingly, benefits may be realized by improved systems and methods for using out-of-band management tools and protocols to remotely perform management operations on a managed node in a computer network while in-band communication with the managed node is not available.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
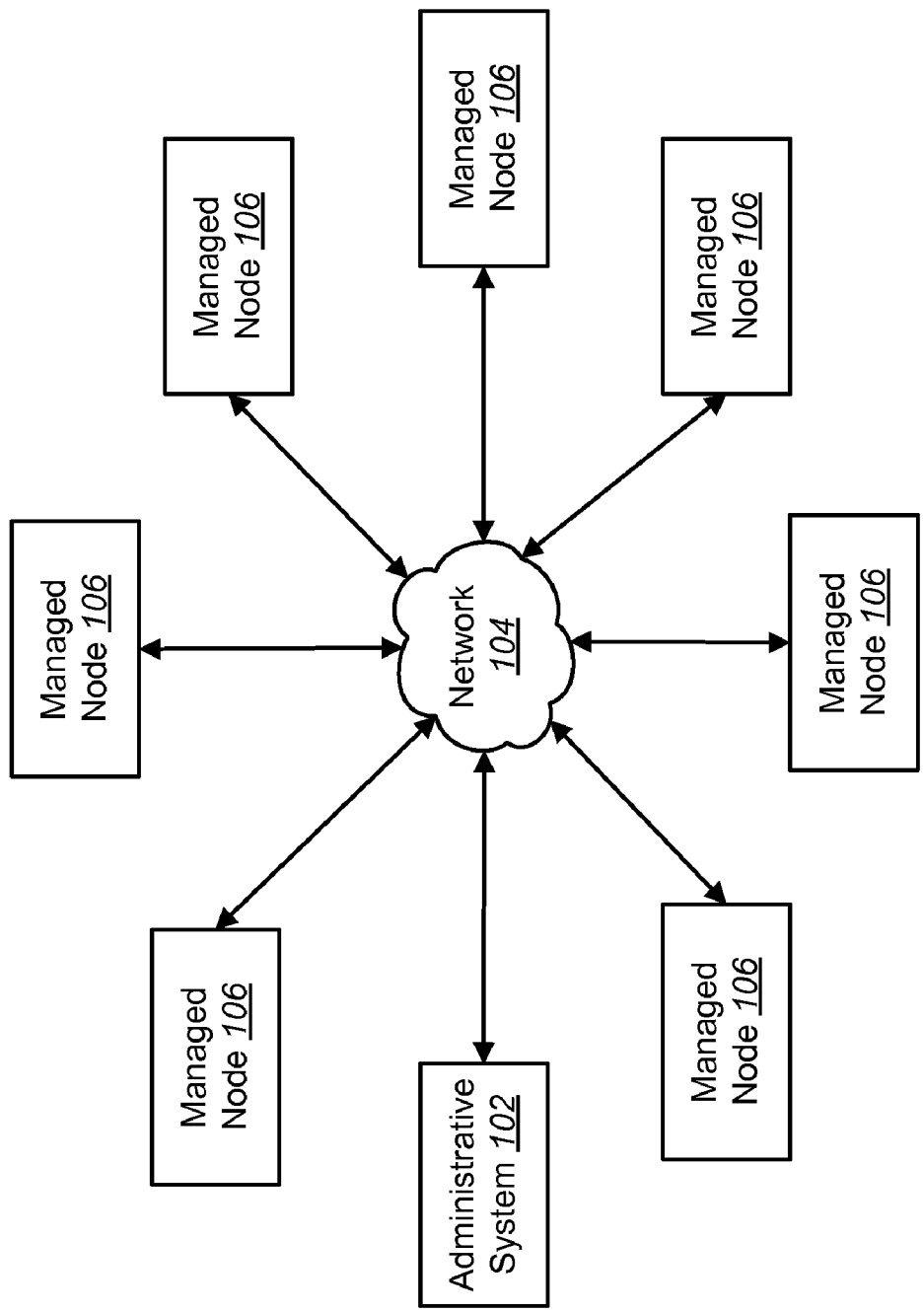
FIG. 1 illustrates an exemplary environment in which embodiments may be practiced, which includes an administrative system and a plurality of managed nodes.

Embodiments disclosed herein relate generally to systems and methods for using out-of-band protocols for remote management while in-band communication is not available. Embodiments disclosed herein facilitate remote management of a managed node by an administrative system via out-of-band protocols while in-band communication with the administrative system is not available.

In accordance with an embodiment, an out-of-band management application that is located on an administrative system sends at least one management command to an out-of-band management stack that is located on a managed node. For example, the out-of-band management application may send a command to perform a recovery operation, to disable/re-enable the managed nodes network stack, etc. The out-of-band management stack may send management commands to the out-of-band management stack via an out-of-band communication channel, which may be separate from a primary communication channel that is used for in-band communication with the managed node.

A monitoring agent is provided on the managed node. The monitoring agent may be part of the managed node's operating system. The monitoring agent obtains the at least one management command that is sent to the out-of-band management stack. There are a variety of ways that this may occur. For example, the out-of-band management stack may forward the at least one management command to the monitoring agent. Alternatively, the out-of-band management stack may write the at least one management command to a designated location on the managed node, and the monitoring agent may then read the at least one management command from the designated location.

In response to obtaining the at least one management command, the monitoring agent processes and carries out the at least one management command. For example, if the at least one management command comprises a command to disable (or re-enable) the managed node's network stack, then the monitoring agent disables (or re-enables) the managed node's network stack.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 illustrates an exemplary environment in which embodiments may be practiced. An administrative computer system 102 is connected to a computer network 104. The administrative system 102 may be used to manage other computer systems that are also connected to the computer network 104. These other computer systems will be referred to herein as managed nodes 106. The managed nodes 106 may be personal computers, servers, printing devices, personal digital assistants (PDAs), cellular telephones, and so forth. The network 104 may include various components (such as routers, gateways, hubs, etc.) which allow the administrative system 102 and the managed nodes 106 to communicate via wired and/or wireless media.

Figure 2:
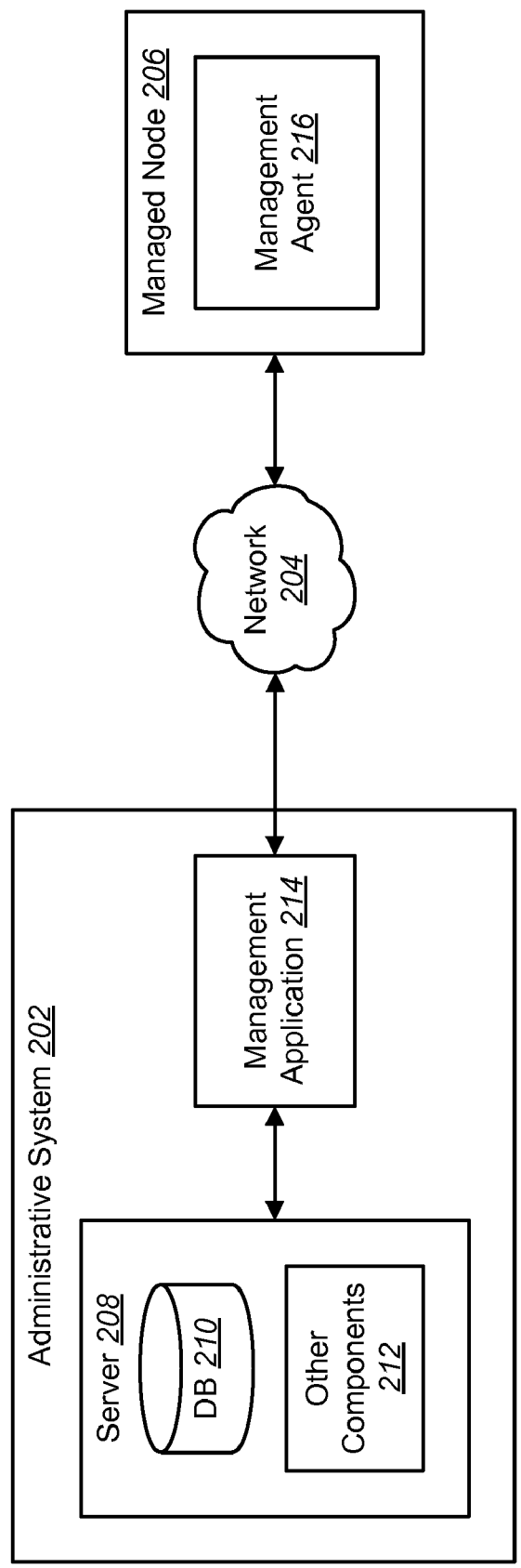
FIG. 2 illustrates various in-band management tools that facilitate remote management of a managed node by an administrative system.

FIG. 2 illustrates various in-band management tools that facilitate remote management of a managed node 206 by an administrative system 202. The administrative system 202 may include a management server 208. The management server 208 may include a database 210 of information. The database 210 may include information about the managed node 206 and also about other managed nodes (not shown) that are connected to the computer network 204 and that the administrative system 202 is responsible for managing. The management server 208 may also include various other components 212 that are configured to perform tasks such as scheduling, handling alerts, and so forth. An example of a management server 208 that may be used is the core server for the LANDesk® Management Suite.

The administrative system 202 may also include a management application 214. The management application 214 may be used to perform various tasks related to the management of the managed node 206 and other managed nodes that are connected to the computer network 104. There are many different kinds of remote management operations that a system administrator may want to perform on the managed node 206. Some examples of remote management operations that may be performed include problem resolution, remote control, software distribution, software license monitoring, operating system imaging and migration, IT asset management, and so forth. As part of performing these tasks, the management application 214 may connect to the management server 208 and query the management server 208 for information. An example of a management application 214 that may be used is the console application for the LANDesk® Management Suite.

The managed node 206 may include a management agent 216. The management agent 216 performs management-related tasks in response to requests from the management application 214. An example of a management agent 216 that may be used is the LANDesk® Management Agent.

In order to remotely perform a management operation on the managed node 206, a system administrator may input instructions to the management application 214 regarding the desired management operation. Upon receiving the user's instructions, the management application 214 may send one or more management commands to the management agent 216 on the managed node 206. Upon receiving and processing the management command(s), the management agent 216 may perform the desired management operation. The management agent 216 may send a report back to the management application 214 regarding whether the management operation was successfully performed.

The components that are shown in FIG. 2 are examples of in-band management tools. In-band management tools may enable a system administrator to perform a variety of management operations on the managed node 206 remotely (e.g., while working at the administrative system 202). However, as indicated above, in-band management tools may be ineffective when the managed node 206 loses network connectivity or is otherwise unavailable for in-band communication. When the managed node 206 cannot be accessed in-band, an out-of-band infrastructure may be used.

Figure 3:
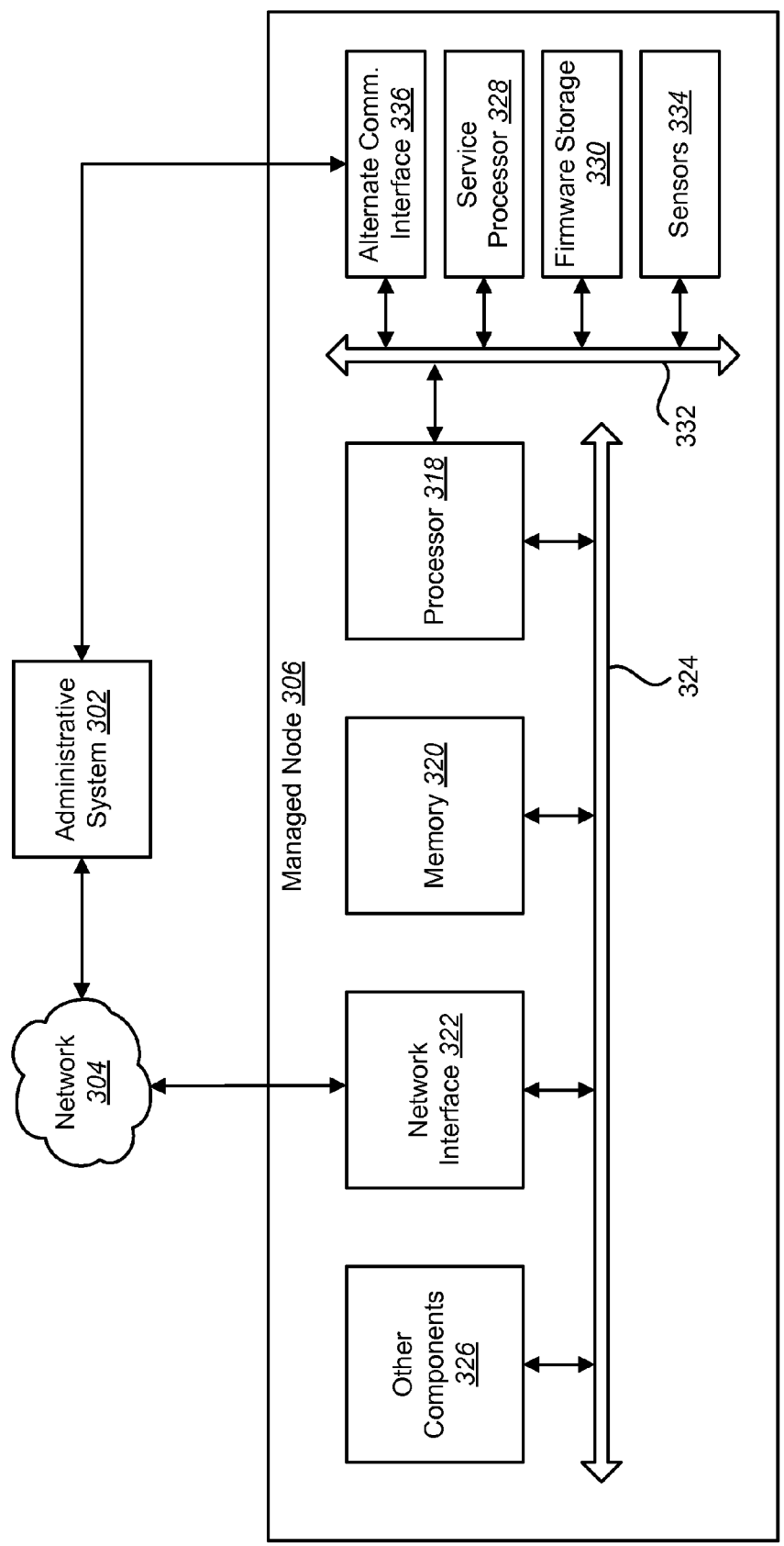
FIG. 3 illustrates an example of a managed node that is configured to facilitate out-of-band management by an administrative system.

FIG. 3 illustrates an example of a managed node 306 that is configured to facilitate out-of-band management by an administrative system 302. The managed node 306 includes a processor 318 and memory 320. The processor 318, which may also be referred to as a microprocessor or a central processing unit (CPU), is the computational and control unit of the managed node 306. The processor 318 performs arithmetic and logic operations based on instructions that are stored within the memory 320. For example, the management agent 216 may be loaded into memory 320 and executed by the processor 318.

The managed node 306 also includes a network interface 322 that facilitates communication between the managed node 306 and other devices (such as an administrative system 302) over a computer network 304. The network interface 322 may be based on wired or wireless communication technology.

A system bus 324 electronically couples the processor 318 to the memory 320, the network interface 322, and other components 326 of the managed node 306. The other components 326 may include secondary storage, input devices, output devices, etc. Although a single bus 324 is shown in FIG. 3, multiple buses may be used to electronically couple the various components of the managed node 306.

In addition to the processor 318, the managed node 306 also includes a service processor 328. The service processor 328 facilitates out-of-band remote management of the managed node 306. The service processor 328 operates independently of the main processor 318. In addition, the service processor 328 has a link to the administrative system 302 that is independent of the main processor's 318 link to the administrative system 302. (This will be discussed in greater detail below.) As a result, the service processor 328 may continue to operate and remain accessible to the administrative system 302 even when a hardware failure, operating system crash, or similar event leaves the main processor 318 inoperable and/or inaccessible to the administrative system 302.

The term "service processor" 328 is a generic term that is used to describe any processor that is provided on a computer system for the purpose of facilitating out-of-band management. A baseband management controller (BMC) is a specific type of service processor 328 that may be used with the embodiments disclosed herein.

The service processor 328 may be electronically coupled to a firmware storage device 330 via a bus 332 that will be referred to as a management bus 332. The firmware storage device 330 stores firmware that may be executed by the service processor 328. The firmware storage device 330 may be implemented using non-volatile storage, which is computer memory that can retain stored information even when it is not powered. Some examples of non-volatile storage that may be used include flash memory, programmable read-only memory (PROM), erasable PROM (EPROM), electrically erasable PROM (EEPROM), etc.

One or more sensors 334 may be electronically coupled to the service processor 328 via the management bus 332. The sensors 334 may be configured to monitor various characteristics of the hardware on the managed node 306, such as temperature, fan speed, voltages, the status of the main processor 318, and so forth.

As indicated above, the service processor 328 has a link to the administrative system 302 that is independent of the main processor's 318 link to the administrative system 302. The administrative system 302 is able to access the main processor 318 over the computer network 304 via the managed node's 306 network interface 322. In contrast, the service processor's 328 link to the administrative system 302 may be provided by an alternate communication interface 336 that is electronically coupled to the administrative system 302. The alternate communication interface 336 is electronically coupled to the service processor 328 via the management bus 332. The alternate communication interface 336 allows the administrative system 302 to communicate with the service processor 328 when the managed node 306 becomes disconnected from the computer network 304.

In the embodiment that is shown in FIG. 3, a single management bus 332 is used to electronically couple the service processor 328 to the firmware storage device 330, the sensors 334, and the alternate communication interface 336. Alternatively, multiple buses may be used to electronically couple these components.

Figure 4:
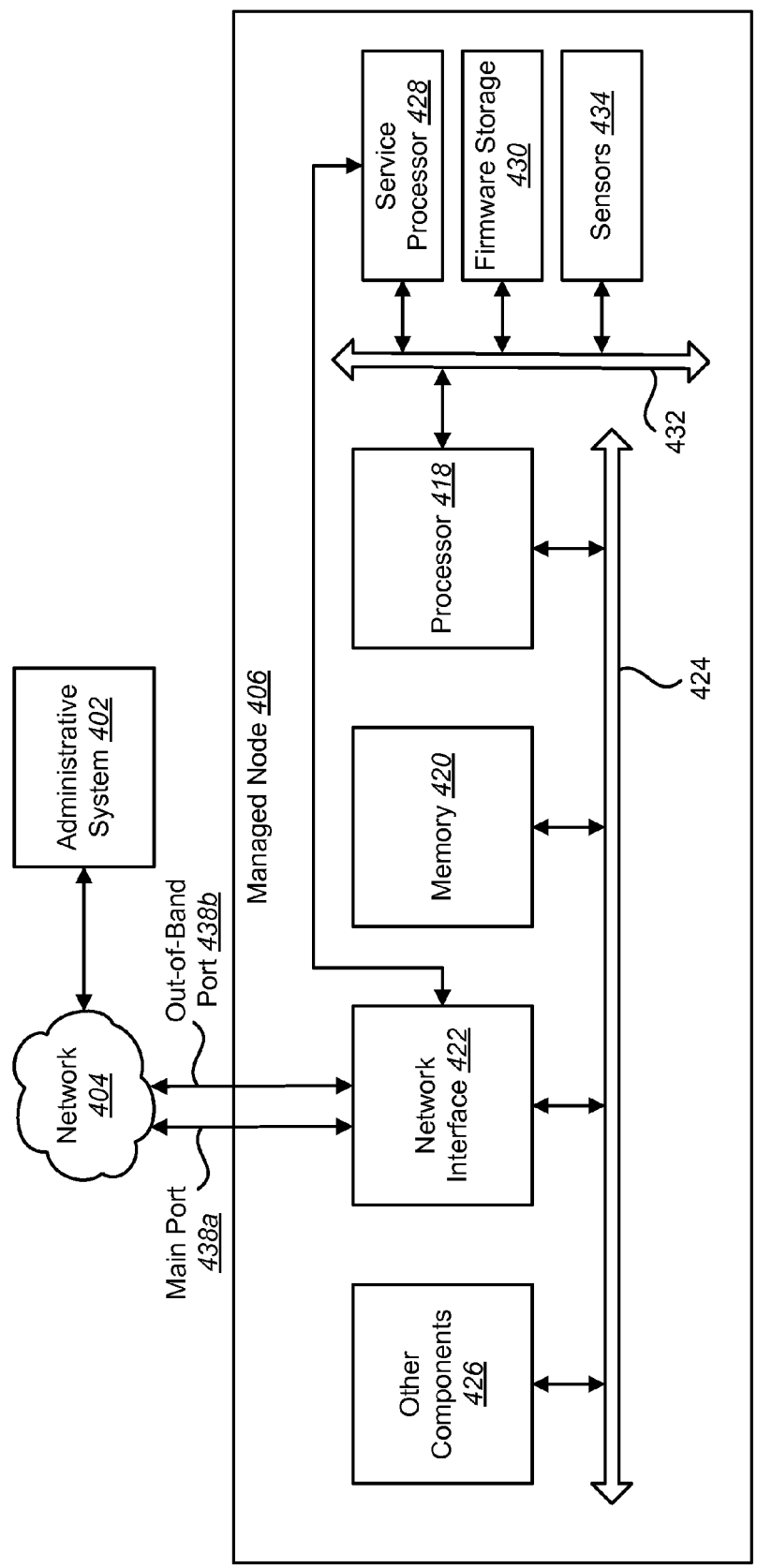
FIG. 4 illustrates another example of a managed node that is configured to facilitate out-of-band management by an administrative system.

FIG. 4 illustrates another example of a managed node 406 that is configured to facilitate out-of-band management by an administrative system 402. The managed node 406 is similar in several respects to the managed node 306 that was discussed above in connection with FIG. 3. In particular, the managed node 406 that is shown in FIG. 4 includes a processor 418 that is electronically coupled to memory 420, a network interface 422 that facilitates communication over a computer network 404, and other components 426 via a system bus 424. The managed node 406 also includes a service processor 428 that is electronically coupled to a firmware storage device 430 and one or more sensors 434 via a management bus 432.

Another similarity is that the service processor 428 has a link to the administrative system 402 that is independent of the main processor's 418 link to the administrative system 402. In the embodiment that is shown in FIG. 4, however, a different mechanism is used to provide the administrative system 402 with access to the service processor 428. In particular, instead of providing an alternate communication interface 336 for the service processor 428, the service processor 428 may be electronically coupled to the network interface 422. This coupling may occur by means other than the system bus 424.

In the depicted embodiment, the network interface 422 provides two ports 438, one port 438a that may be used by the main processor 418, and another port 438b that may be used by the service processor 428 to facilitate out-of-band management of the managed node 406 by the administrative system 402. The port 438a that may be used by the main processor 418 will be referred to as the main port 438a. The port 438b that may be used by the service processor 428 will be referred to as the out-of-band port 438b. The main port 438a and the out-of-band port 438b may be configured with different IP addresses.

Figure 5:
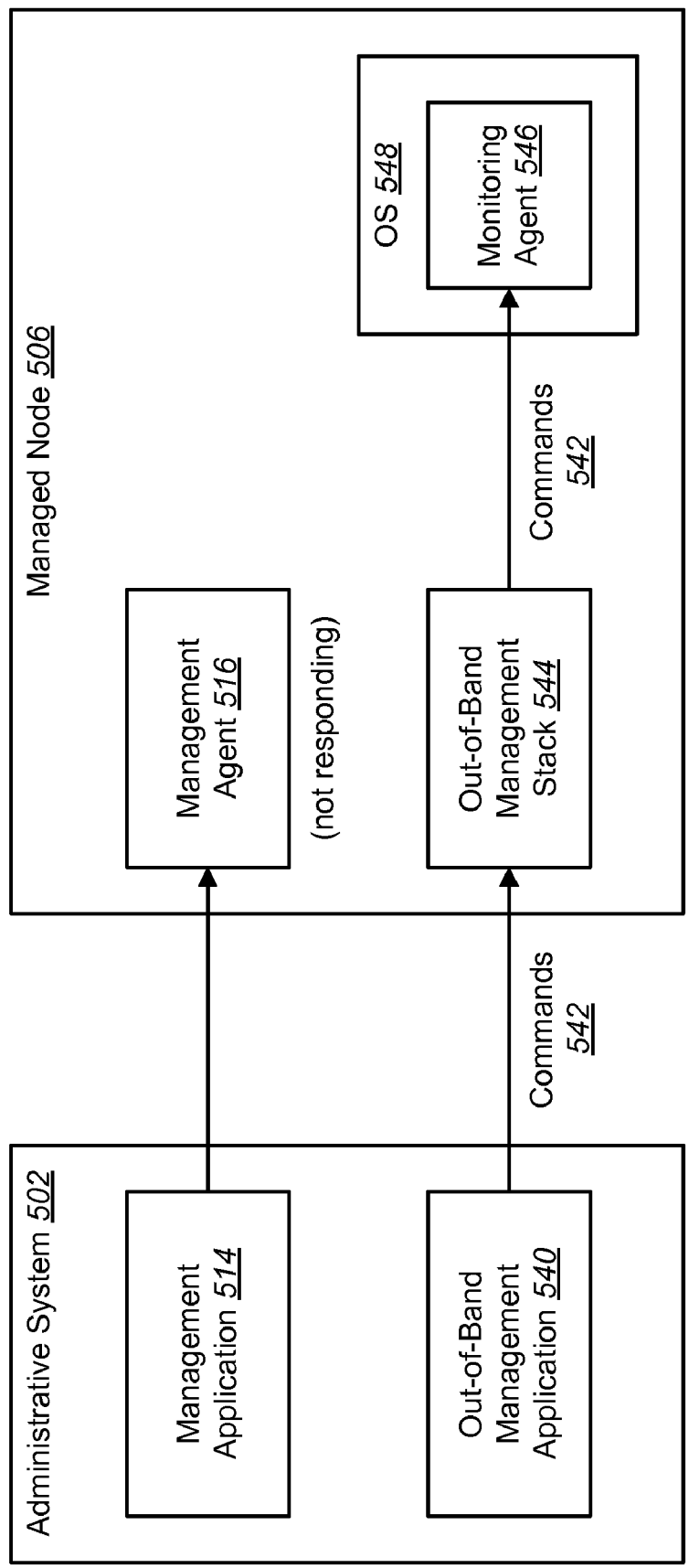
FIG. 5 illustrates various components that may be used to facilitate out-of-band management of a managed node by an administrative system according to an embodiment.

FIG. 5 illustrates various components that may be used to facilitate out-of-band management of a managed node 506 by an administrative system 502 according to an embodiment. As shown, the administrative system 502 may include a management application 514, and the managed node 506 may include a management agent 516. The management application 514 and the management agent 516 are examples of in-band management tools that may be used. The management application 514 may be configured similarly to the management application 214 that was discussed in connection with FIG. 2. The management agent 516 may be configured similarly to the management agent 216 that was discussed in connection with FIG. 2.

In addition to the management application 514, the administrative system 502 may also include an out-of-band management application 540. The out-of-band management application 540 may be a separate program from the management application 514.

In addition to the management agent 516, the managed node 506 may include an out-of-band management stack 544. The out-of-band management stack 544 may be a separate program from the management agent 516. If the managed node 506 is configured similarly to the managed node 306 that was discussed above in connection with FIG. 3, the out-of-band management stack 544 may be stored in the firmware storage device 330 and executed by the service processor 328.

A system administrator may initially try to perform remote management operations on the managed node 506 using the management application 514. However, there may be some reason why the management application 514 is not able to communicate with the management agent 516.

In order to remotely perform a management operation on a managed node 506 when in-band communication is not available, a system administrator may input instructions to the out-of-band management application 540 regarding the desired management operation. Upon receiving the system administrator's instructions, the out-of-band management application 540 may send one or more management commands 542 to an out-of-band management stack 544 on the managed node 506.

A monitoring agent 546 may be provided on the managed node 506 to carry out management commands 542 that the out-of-band management stack 544 receives from the out-of-band management application 540. As shown, the monitoring agent 546 may be part of an operating system 548 on the managed node 506. For example, the monitoring agent 546 may be implemented as an operating system service, an operating system daemon, etc.

When the out-of-band management application 540 receives a management command 542 from the out-of-band management application 540, the out-of-band management application 540 forwards the management command 542 to the monitoring agent 546. When the monitoring agent 546 receives a management command 542 from the monitoring agent 546, the monitoring agent 546 processes and carries out the command 542.

Figure 6:
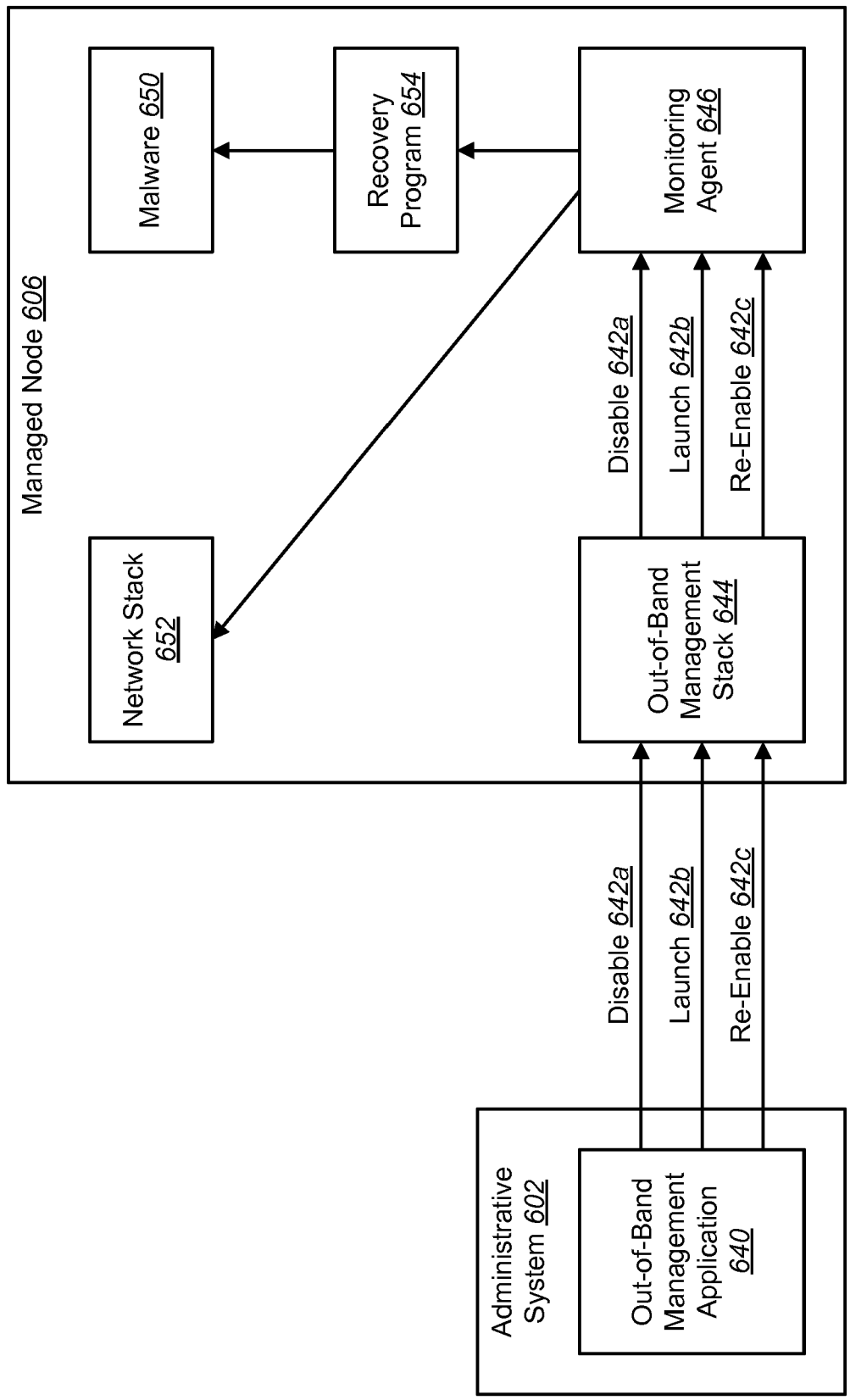
FIG. 6 illustrates how out-of-band protocols may be utilized to remotely perform management operations on a managed node that has become infected with malware.

FIG. 6 illustrates how out-of-band protocols may be utilized to remotely perform management operations on a managed node 606 that has become infected with malware 650 (e.g., a worm, virus, etc.). The malware 650 may be using the managed node's 606 network stack 652 to attack other devices on the computer network 104. If this occurs, it may be beneficial for the system administrator to be able to remotely perform certain management operations on the managed node 606, such as disabling the managed node's 606 network stack 652. However, the malware 650 may be consuming substantially all of the resources of the main processor 318 on the managed node 606, and as a result, in-band communication with the managed node 606 may not be possible. For example, management commands that are sent to the management agent 216 may time out before they are processed.

If in-band communication with the managed node 606 is not available, a system administrator may make use of out-of-band management protocols and tools to remotely perform management operations on the managed node 606. For example, in order to remotely disable the managed node's 606 network stack 652, the system administrator may use the out-of-band management application 640 to send a command 642a to the out-of-band management stack 644 to disable the managed node's 606 network stack 652. The out-of-band management stack 644 forwards the disable command 642a to the monitoring agent 646. In response to receiving the disable command 642a, the monitoring agent 646 processes and carries out the disable command 642a by disabling the managed node's 606 network stack 652. This has the effect of preventing the malware 650 from continuing to attack other devices on the computer network 104.

In order to remove or quarantine the malware 650 from the managed node 606, the system administrator may use the out-of-band management application 640 to send a command 642b to the out-of-band management stack 644 to launch a recovery program 654. The out-of-band management stack 644 forwards the launch command 642b to the monitoring agent 646. In response to receiving the launch command 642b, the monitoring agent 646 processes and carries out the launch command 642b by launching a recovery program 654 to remove or quarantine the malware 650 from the managed node 606. An example of a recovery program 654 that may be used is the vulnerability scanner that is provided in the LANDesk® Patch Manager.

Once the malware 650 has been removed or quarantined from the managed node 606, the system administrator may use the out-of-band management application 640 to send a command 642c to the out-of-band management stack 644 to re-enable the network stack 652. The out-of-band management stack 644 forwards the re-enable command 642c to the monitoring agent 646. In response to receiving the re-enable command 642c, the monitoring agent 646 processes and carries out the re-enable command 642c by re-enabling the managed node's 606 network stack 652. Once this occurs, the managed node 606 may once again be able to send data to and receive data from other devices on the computer network 104. It may also be possible to remotely perform management operations on the managed node 606 using in-band management tools and protocols (e.g., the management application 214 and the management agent 216).

Figure 7:
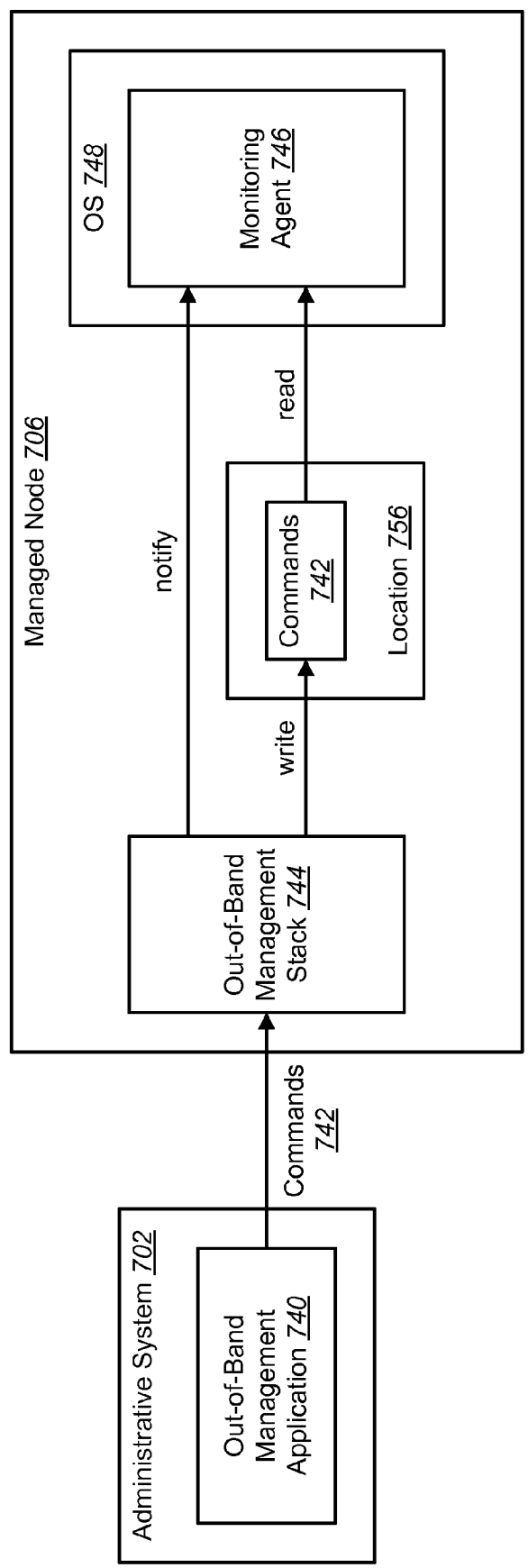
FIG. 7 illustrates various components that may be used to facilitate out-of-band management of a managed node by an administrative system according to another embodiment.

FIG. 7 illustrates the operation of various components on an administrative system 702 and a managed node 706 in order to facilitate out-of-band management by the administrative system 702 according to another embodiment. The embodiment that is shown in FIG. 7 is similar in several respects to the embodiment that is shown in FIG. 5 and that was discussed in connection therewith. In particular, a system administrator may input instructions to an out-of-band management application 740 regarding a desired management operation. Upon receiving the system administrator's instructions, the out-of-band management application 740 may send one or more management commands 742 to the out-of-band management stack 744.

However, in the embodiment that is depicted in FIG. 7, the out-of-band management stack 744 does not forward the management commands 742 to the monitoring agent 746. Instead, a location 756 on the managed node 706 that is accessible to the monitoring agent 746 is designated for storing management commands 742 that are received from the out-of-band management application 740. The out-of-band management stack 744 is configured so that whenever it receives a management command 742 from the out-of-band management application 740, it writes the command 742 to this designated location 756.

The monitoring agent 746 periodically monitors the designated location 756. Consequently, at some point after the out-of-band management stack 744 writes a management command 742 to the designated location 756, the monitoring agent 746 reads the designated location 756 and thereby receives the management command 742. When the monitoring agent 746 receives a management command 742, the monitoring agent 746 processes and carries out the command 742.

In the depicted embodiment, the out-of-band management stack 744 designates the location 756 where management commands 742 are stored, and notifies the monitoring agent 746 about the designated location 756. Alternatively, the monitoring agent 746 may designate the location 756 and notify the out-of-band management stack 744 about the location 756. Alternatively still, another component may designate the location 756 and notify both the out-of-band management stack 744 and the monitoring agent 746 about the designated location 756.

Figure 8:
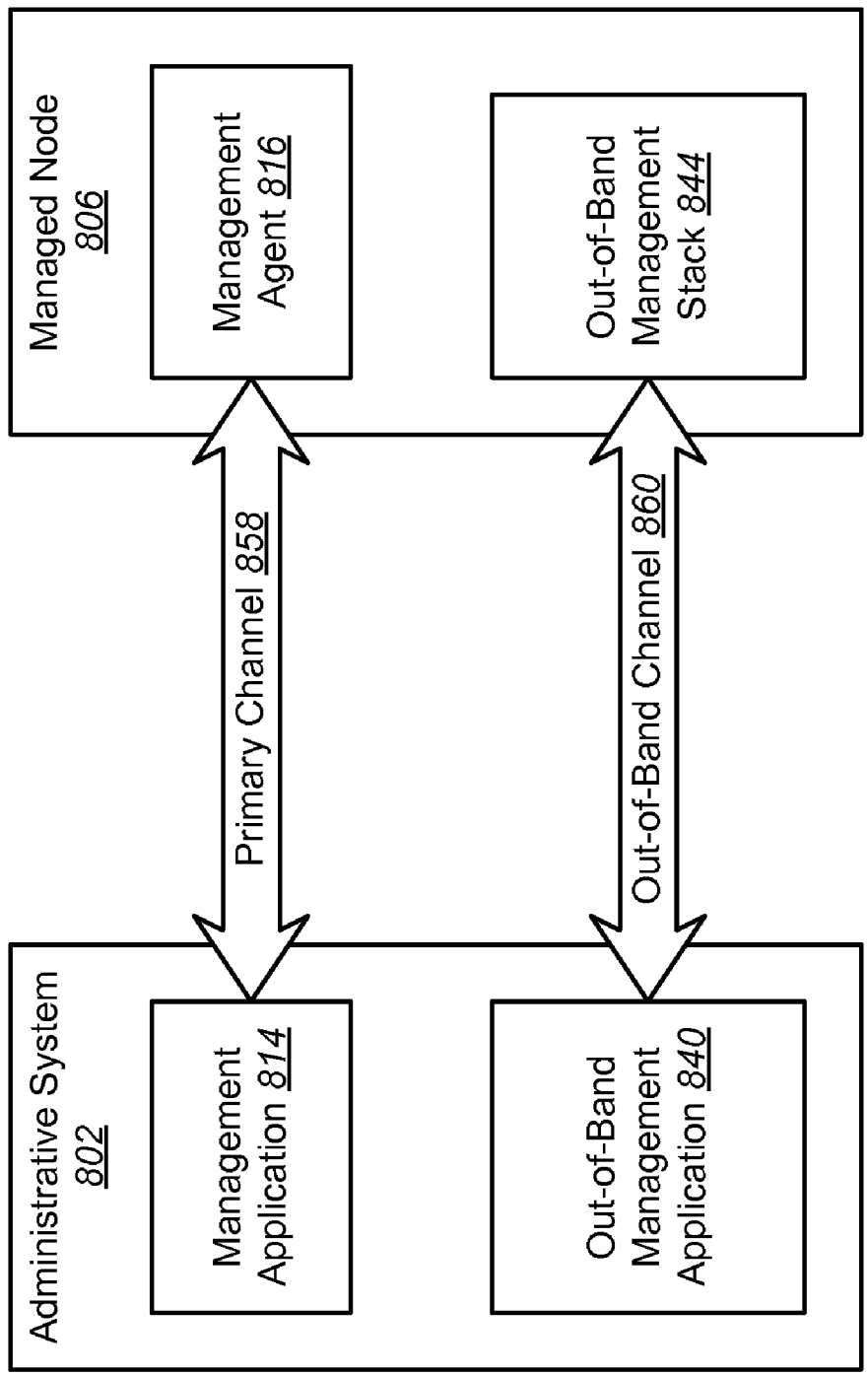
FIG. 8 illustrates logical communication channels that may be established between an administrative system and a managed node according to an embodiment.

FIG. 8 illustrates logical communication channels that may be established between an administrative system 802 and a managed node 806 according to an embodiment. The managed node 806 may be configured similarly to the managed node 306 that was discussed above in connection with FIG. 3 or the managed node 406 that was discussed above in connection with FIG. 4. Other configurations of the managed node 806 are also possible.

As shown, the administrative system 802 may include a management application 814, and the managed node 806 may include a management agent 816. The management application 814 and the management agent 816 may operate similarly to the management application 214 and the management agent 216 that were discussed above in connection with FIG. 2. The management application 814 and the management agent 816 are examples of in-band management tools that may be used.

The administrative system 802 may also include an out-of-band management application 840, and the managed node 806 may also include an out-of-band management stack 844. The out-of-band management application 840 and the out-of-band management stack 844 are examples of out-of-band management tools that may be used. The out-of-band management application 840 may be configured similarly to any of the out-of-band management applications 540, 640, 740 that were discussed above in connection with FIGS. 5-7. The out-of-band management stack 844 may be configured similarly to any of the out-of-band management stacks 544, 644, 744 that were discussed above in connection with FIGS. 5-7. Other configurations of the out-of-band management application 840 and the out-of-band management stack 844 are also possible.

The management application 814 may communicate with the management agent 816 via a communication channel 858 that will be referred to as the primary communication channel 858. In embodiments where the managed node 806 is configured similarly to the managed node 306 that was discussed above in connection with FIG. 3, the primary communication channel 858 may include the network interface 322, and the out-of-band communication channel 860 may include the alternate communication interface 336.

The out-of-band management stack 844 may be configured so that it does not use the primary communication channel 858 to communicate with the out-of-band management application 840. Instead, the out-of-band management stack 844 may be configured to communicate with the out-of-band management application 840 via a communication channel 860 that is separate from the primary communication channel 858. This communication channel 860 will be referred to as an out-of-band communication channel 860. In embodiments where the managed node 806 is configured similarly to the managed node 406 that was discussed above in connection with FIG. 4, the primary communication channel 858 may include the main port 438a that is provided by the network interface 422, and the out-of-band communication channel 860 may include the out-of-band port 438b that is provided by the network interface 422.

In the depicted embodiment, a single out-of-band communication channel 860 is provided between the out-of-band management application 840 and the out-of-band management stack 844. In an alternative embodiment, multiple out-of-band communication channels may be provided.

Figure 9:
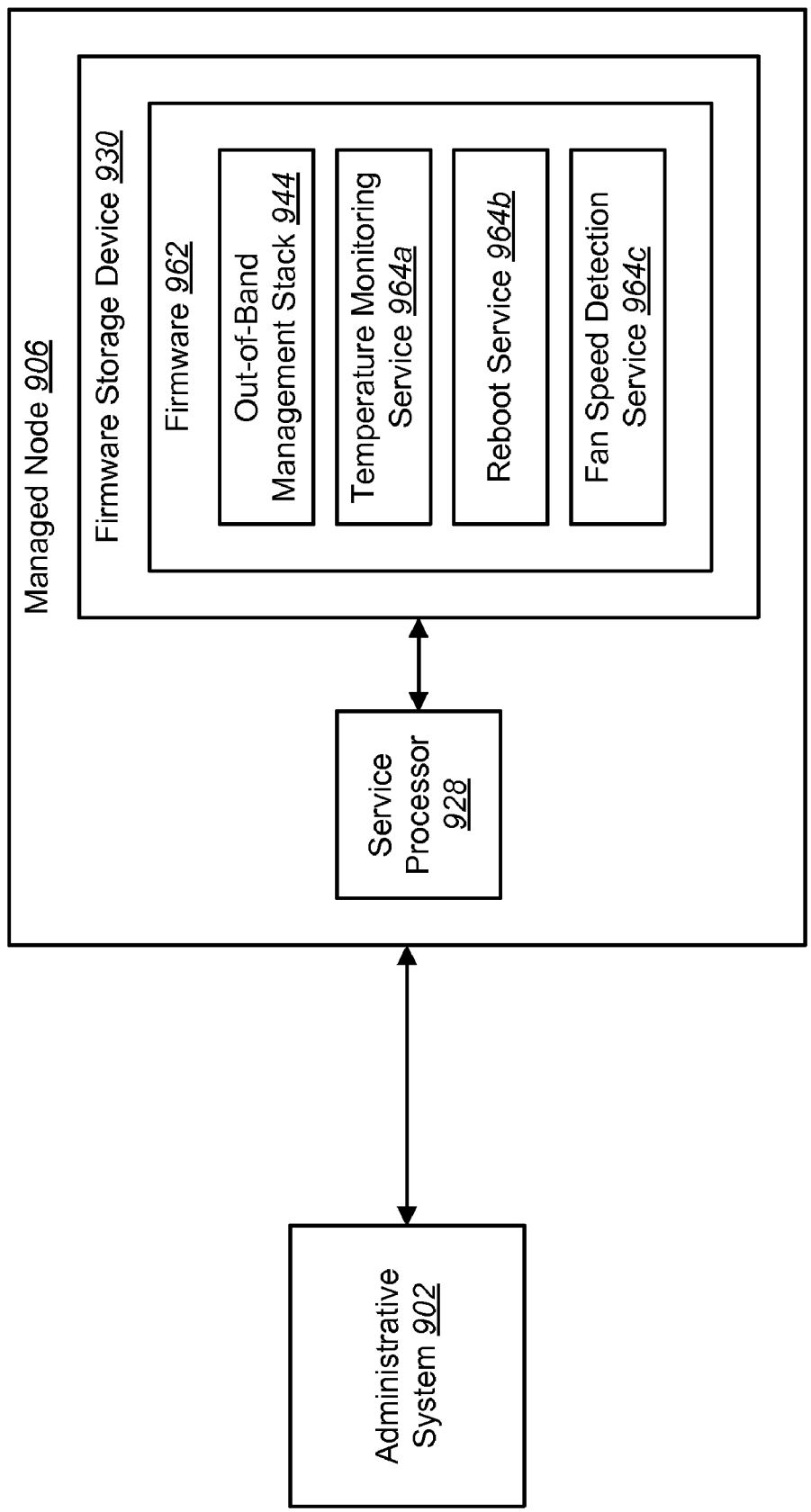
FIG. 9 illustrates firmware that may be provided in a firmware storage device on a managed node that is in electronic communication with an administrative system.

FIG. 9 illustrates firmware 962 that may be provided in a firmware storage device 930 on a managed node 906 that is in electronic communication with an administrative system 902. The firmware 962 may be executed by a service processor 928 on the managed node 906. The service processor 928 may be configured similarly to either of the service processors 328, 428 that were discussed above in connection with FIGS. 3-4. Other configurations of the service processor 928 are also possible.

The firmware 962 may include an out-of-band management stack 944. The out-of-band management stack 944 may be configured similarly to any of the out-of-band management stacks 544, 644, 744, 844 that were discussed above in connection with FIGS. 5-8. Other configurations of the out-of-band management stack 944 are also possible.

The firmware 962 may also include various services 964 that facilitate out-of-band management of the managed node 906 by the administrative system 902. One example of a service 964 that may be provided in the firmware 962 is a temperature monitoring service 964a. The temperature monitoring service 964a may be configured to monitor the temperature of one or more components (e.g., a processor) of the managed node 906. If the temperature has exceeded a pre-defined threshold, the temperature monitoring service 964a may report this to the administrative system 902.

Another example of a service 964 that may be provided is a reboot service 964b. The reboot service 964b may operate to reboot the managed node 906. The reboot service 964b may be executed in response to a command from the administrative system 902. There are a variety of circumstances under which a system administrator may use the reboot service 964b. For example, if the operating system (not shown) on the managed node 906 were to crash, the reboot service 964b would permit a remote reboot of the managed node 906. The system administrator could then watch the boot process remotely to ensure that the managed node 906 is restored to operational status.

Another example of a service 964 that may be provided is a fan speed detection service 964c. The fan speed detection service 964c may operate to detect the speed of a ventilation fan (not shown) on the managed node 906. If the fan speed drops below a pre-defined threshold (which may indicate that the ventilation fan is broken), this could trigger an action such as throttling the activity of the main processor (not shown) of the managed node 906 to prevent overheating and permanent hardware damage. The fan speed detection service 964c may also report such an event to the administrative system 902.

The temperature monitoring service 964a, reboot service 964b, and fan speed detection service 964c are only examples of the kinds of services 964 that may be provided in the firmware 962. Other services 964 that facilitate out-of-band management of the managed node 906 may also be provided.

Figure 10:
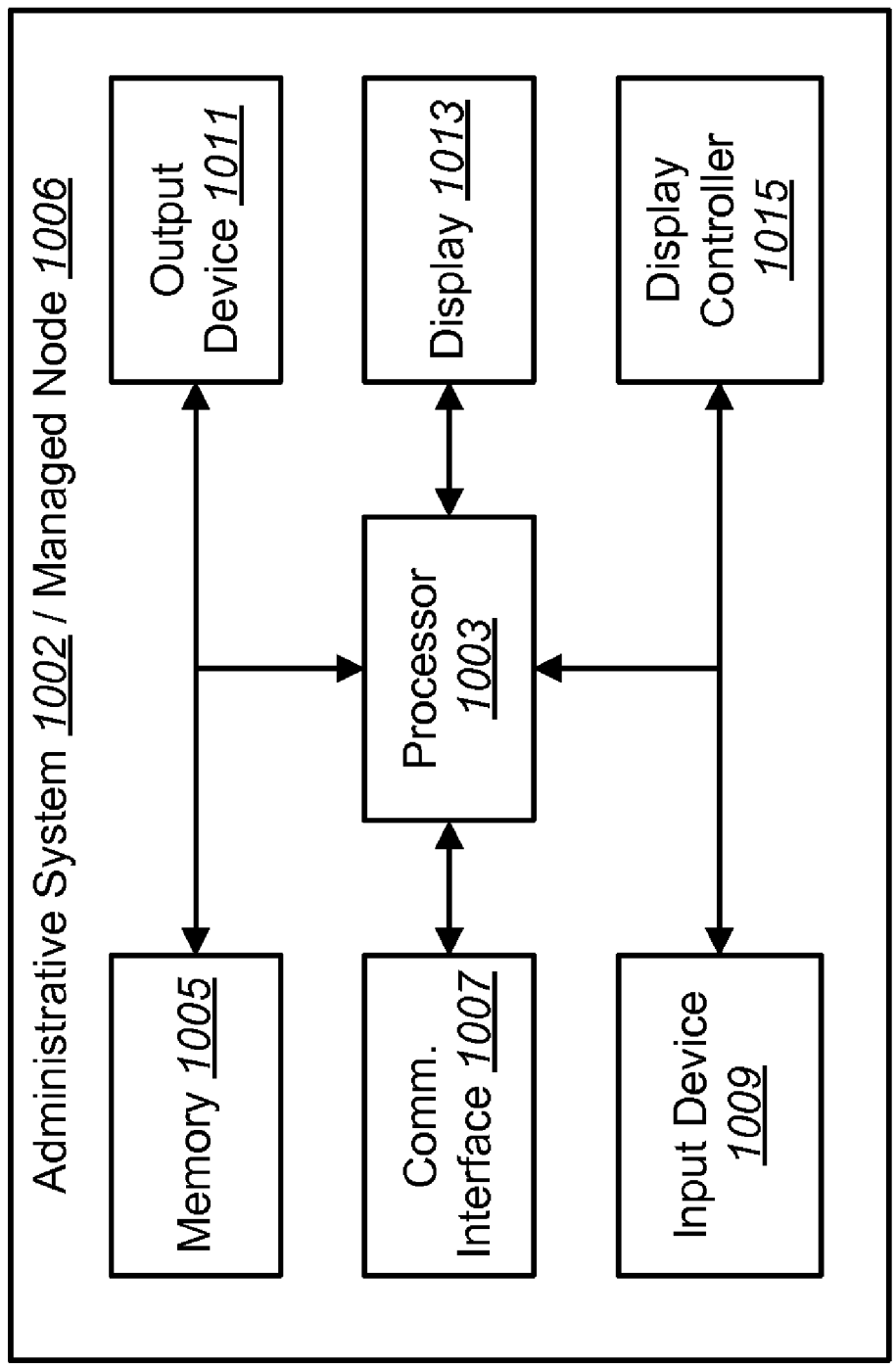
FIG. 10 illustrates various components that may be utilized in an administrative system and/or a managed node.

FIG. 10 illustrates various components that may be utilized in an administrative system 1002 and/or a managed node 1006. The illustrated components may be located within the same physical structure or in separate housings or structures.

The administrative system 1002 and/or managed node 1006 includes a processor 1003 and memory 1005. The processor 1003 controls the operation of the administrative system 1002 and/or managed node 1006 and may be embodied as a microprocessor, a microcontroller, a digital signal processor (DSP) or other device known in the art. The processor 1003 typically performs logical and arithmetic operations based on program instructions stored within the memory 1005.

The administrative system 1002 and/or managed node 1006 typically also includes one or more communication interfaces 1007 for communicating with other electronic devices. The communication interfaces 1007 may be based on wired communication technology, wireless communication technology, or both. Examples of different types of communication interfaces 1007 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The administrative system 1002 and/or managed node 1006 typically also includes one or more input devices 1009 and one or more output devices 1011. Examples of different kinds of input devices 1009 include a keyboard, mouse, microphone, remote control device, button, joystick, trackball, touchpad, lightpen, etc. Examples of different kinds of output devices 1011 include a speaker, printer, etc. One specific type of output device which is typically included in a computer system is a display device 1013. Display devices 1013 used with embodiments disclosed herein may utilize any suitable image projection technology, such as a cathode ray tube (CRT), liquid crystal display (LCD), light-emitting diode (LED), gas plasma, electroluminescence, or the like. A display controller 1015 may also be provided, for converting data stored in the memory 1005 into text, graphics, and/or moving images (as appropriate) shown on the display device 1013.

Of course, FIG. 10 illustrates only one possible configuration of a administrative system 1002 and/or managed node 1006. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium or computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In a managed node, a method for allowing remote management of the managed node by an administrative system via out-of-band protocols while in-band communication with the administrative system is not available, the method comprising:

an out-of-band management stack that is located on the managed node receiving at least one management command from an out-of-band management application that is located on the administrative system, the management command being received from the out-of-band management application after it is detected that the in-band communication with the administrative system is not available, wherein the in-band communication is received by an in-band management agent via a network stack, wherein the in-band communication is sent from a management application on the administrative system, wherein the management application is separate from the out-of-band management application, and wherein the out-of-band management application manages the managed node independently of the management application, and wherein the in-band management agent does not use the out-of-band management stack;

a service processor retrieving the at least one management command from the out-of-band management stack and sending it to a monitoring agent;

the monitoring agent on the managed node obtaining the at least one management command, and wherein the monitoring agent is separate from the in-band management agent, the network stack, the out-of-band management application and the out-of-band management stack, wherein the monitoring agent is a daemon that is part of an operating system of the managed node; and in response to obtaining the at least one management command, the monitoring agent processing and carrying out the at least one management command.

2. The method of claim 1, further comprising the service processor forwarding the at least one management command to the monitoring agent.

3. The method of claim 1, further comprising:

the service processor writing the at least one management command to a designated location on the managed node; and the monitoring agent reading the at least one management command from the designated location.

4. The method of claim 3, further comprising the service processor notifying the monitoring agent about the designated location.

5. The method of claim 1, wherein the at least one management command comprises a command to disable the managed node's network stack.

6. The method of claim 5, wherein the at least one management command comprises a command to perform a recovery operation.

7. The method of claim 6, wherein the at least one management command comprises a command to re-enable the managed node's network stack.

8. The method of claim 7, wherein the out-of-band management stack is executed by the service processor on the managed node.

9. A managed node that is configured to allow remote management by an administrative system via out-of-band protocols while in-band communication with the administrative system is not available, a computer system comprising:
  a processor;
  memory that is in electronic communication with the processor;
  a service processor;
  a firmware storage device that is in electronic communication with the service processor;
  an out-of-band management stack in the firmware storage device, the out-of-band management stack being executable by the service processor to receive at least one management command from an out-of-band management application that is located on the administrative system, the management command being received from the out-of-band management application after it is detected that the in-band communication with the administrative system is not available, wherein the in-band communication is received by an in-band management agent via a network stack, wherein the in-band communication is sent from a management application on the administrative system, wherein the management application is separate from the out-of-band management application, and wherein the out-of-band management application manages the managed node independently of the management application, and wherein the in-band management agent does not use the out-of-band management stack, and wherein the service processor retrieves the at least one management commands and sends it to a monitoring agent; and
  the monitoring agent in the memory, the monitoring agent being executable by the processor to obtain the at least one management command and to process and carry out the at least one management command, and wherein the monitoring agent is separate from the in-band management agent, the network stack, the out-of-band management application and the out-of-band management stack, wherein the monitoring agent is a daemon that is part of an operating system of the managed node.

10. The managed node of claim 9, wherein the service processor to forwards the at least one management command to the monitoring agent.

11. The managed node of claim 9, wherein the service processor to writes the at least one management command to a designated location on the managed node, and wherein the monitoring agent is also executable by the processor to read the at least one management command from the designated location.

12. The managed node of claim 9, wherein the at least one management command comprises a disable command to disable the managed node's network stack, a recovery command to perform a recovery operation, and a re-enable command to re-enable the managed node's network stack.

13. The managed node of claim 9, further comprising an operating system in the memory.

14. A non-transitory computer-readable medium comprising executable instructions for allowing remote management of a managed node by an administrative system via out-of-band protocols while in-band communication with the administrative system is not available, the instructions being executable to:
  receive, by an out-of-band management stack that is located on the managed node, at least one management command from an out-of-band management application that is located on the administrative system, the management command being received from the out-of-band management application after it is detected that the in-band communication with the administrative system is not available, wherein the in-band communication is received by an in-band management agent via a network stack, wherein the in-band communication is sent from a management application on the administrative system, wherein the management application is separate from the out-of-band management application, and wherein the out-of-band management application manages the managed node independently of the management application, and wherein the in-band management agent does not use the out-of-band management stack;
  retrieve, by a service processor, the at least one management command from the out-of-band management stack and send it to a monitoring agent;
  obtain, by the monitoring agent on the managed node, the at least one management command; and
  process and carry out by the monitoring agent, in response to obtaining the at least one management command, the at least one management command, and wherein the monitoring agent is separate from the in-band management agent, the network stack, the out-of-band management application and the out-of-band management stack, wherein the monitoring agent is a daemon that is part of an operating system of the managed node.

15. The non-transitory computer-readable medium of claim 14, wherein the instructions are further executable to forward, by the service processor, the at least one management command to the monitoring agent.

16. The non-transitory computer-readable medium of claim 14, wherein the instructions are further executable to:
  write, by the service processor, the at least one management command to a designated location on the managed node; and
  read, by the monitoring agent, the at least one management command from the designated location.

17. The non-transitory computer-readable medium of claim 14, wherein the at least one management command comprises a disable command to disable the managed node's network stack, a recovery command to perform a recovery operation, and a re-enable command to re-enable the managed node's network stack.

18. The non-transitory computer-readable medium of claim 14, wherein the monitoring agent is part of the managed node's operating system.

* * * * *

UNITED STATES PATENT AND TRADEMARK OFFICE
CERTIFICATE OF CORRECTION

PATENT NO. : 8,295,157 B1
APPLICATION NO. : 11/401156
DATED : October 23, 2012
INVENTOR(S) : Plinio Pimentel et al.

It is certified that error appears in the above-identified patent and that said Letters Patent is hereby corrected as shown below:

In the Claims:

In column 13, line 59 please delete "processor to forwards" and replace it with --processor fowards--.

In column 13, line 62 please delete "processor to writes" and replace it with --processor writes--.

Signed and Sealed this
First Day of October, 2013

Teresa Stanek Rea
*Deputy Director of the United States Patent and Trademark Office*